Jan. 26, 1932.  A. CARLSON  1,842,539
AUTOMOBILE BODY
Filed June 8, 1925  2 Sheets-Sheet 1

Inventor
Alexander Carlson
By Maréchal + Fehr
Attorneys

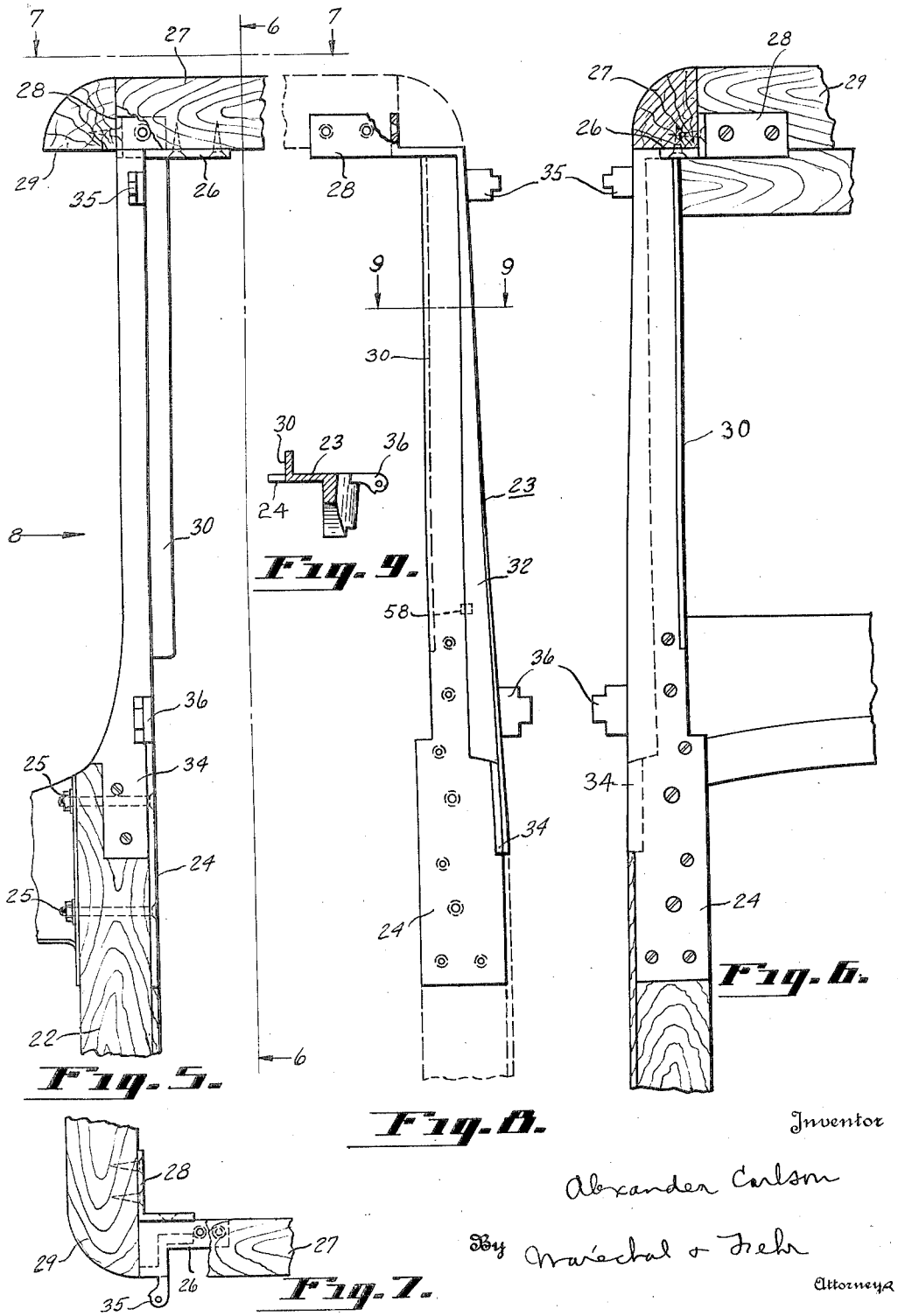

Patented Jan. 26, 1932

1,842,539

UNITED STATES PATENT OFFICE

ALEXANDER CARLSON, OF PIQUA, OHIO

AUTOMOBILE BODY

Application filed June 8, 1925. Serial No. 35,713.

This invention relates to the construction of automobile bodies and particularly to automobile bodies of the closed car type.

One of the principal objects of the present invention is to provide such a construction of the body pillars or uprights, and the associated abutting parts, as to improve the visibility from the driver's seat, whereby the driver is enabled to have a clear vision of automobiles or other approaching objects.

Another object of the invention is to provide such a construction of the body pillar and the associated abutting door and windshield members, that the combined width of these parts taken at right angles to the direction of view of the driver is less than the normal distance between the driver's eyes.

Other and further objects of the invention will be apparent from the following description taken in connection with the accompanying drawings, in which:

Fig. 5 is an enlarged side elevation of a pillar, parts being broken away for clearness in illustration;

Fig. 6 is a section taken on the line 6—6 of Fig. 5;

Fig. 7 is a fragmentary view looking in the direction 7—7 of Fig. 5;

Fig. 8 is a front elevation of the upper part of a pillar constructed in accordance with the present invention;

Fig. 9 is a section taken on the line 9—9 of Fig. 8; and

Figure 10:
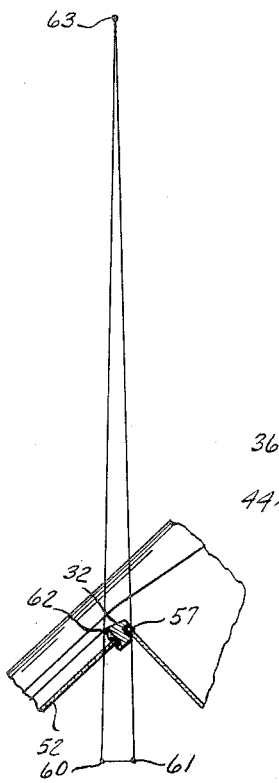
Fig. 10 is a diagrammatic view illustrating the operation of the present invention.
Figure 2:
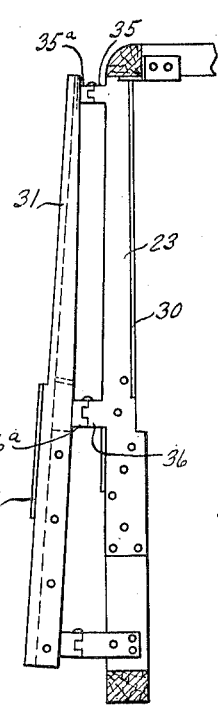
Fig. 2 is a vertical section on the line 2—2 of Fig. 1, the door being swung into wide open position.
Figure 1:
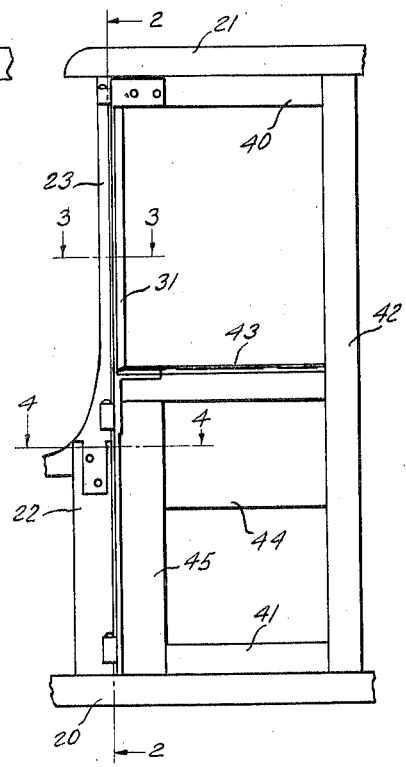
Fig. 1 is a side elevation of the forward part of an automobile body construction embodying the present invention.

Referring to the drawings 20 represents the floor of the automobile body and 21 represents the roof portion thereof which is supported from the floor by means of a number of pillars. In the drawings I have illustrated the left front pillar and door construction of an automobile body in which the present invention is incorporated, but it will be understood that the invention may be and preferably is also incorporated in the right front pillar and door construction, and that certain features of the invention may be embodied in other portions of the body construction.

Figure 4:
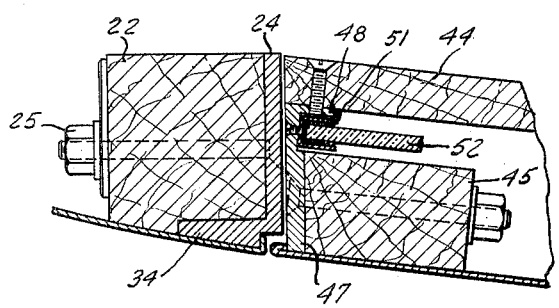
Fig. 4 is a section on the line 4—4 of Fig. 1.
Figure 3:
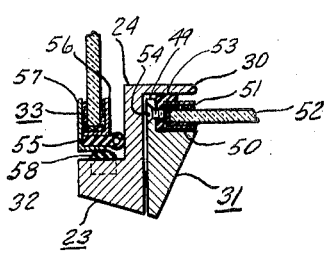
Fig. 3 is a section on the line 3—3 of Fig. 1.

The left front pillar comprises a lower pillar section 22 which may be of wood as in the conventional construction and is preferably of heavy section as shown in Fig. 4. Upper pillar portion 23 is preferably constructed of iron, brass, or other suitable material and is of greatly reduced section as shown in Fig. 3. The upper pillar member 23 consists primarily of a plate portion 24 which is extended downwardly to the lower section of the pillar and set into its rear face, being secured to the lower pillar section by means of bolts 25 or other suitable fastening means. The rear face of the pillar constitutes an abutment for the edge of the door. The upper end of the pillar section 23 is provided with a horizontally disposed rearwardly extending arm 26 adapted to be secured to the longitudinal extending or side roof rail 27, and a laterally extending flange 28 by which the pillar may be secured to the cross rail member 29 of the roof, thereby securing the top or roof member of the body securely to the floor member.

Referring particularly to Fig. 3, it will be noted that the upper pillar section is of substantially Z-shaped cross section. The main body portion consists of the plate 24 extending in a transverse direction and having a flange 30 extending rearwardly from the inner edge thereof to provide a rabbet to receive the door post 31, and having a portion 32 extending forwardly from the outer edge thereof to provide a rabbet adapted to receive the wind-shield frame 33. It is to be noted that the rear surface of the plate 24 abuts the edge of a door and the front face 24 forms an abutment for the wind-shield frame 33. Referring to Figs. 5, 6 and 8 it will be seen that the upper pillar section is widened and thickened at its lower end where it rests upon the upper end of the lower pillar section 22, the outlines of the pillar sections conforming with the general outline and design of the body. The upper pillar section is also provided at its lower end with a forwardly extending flange 34 which is set into the outer side of the lower pillar 22 and by which the connection between the upper and lower pillar sections may be reinforced. Door hinges 35 and 36 are preferably formed integral with the upper pillar section, as best illustrated in Figs. 5, 6 and 8.

The door comprises top and bottom horizontally disposed frame members 40 and 41, a rear post member 42, a belt rail 43 and a lock board 44, all of which may be of conventional heavy-section construction. The front post of the door comprises a lower portion 45 which is disposed below the belt rail and which may be of heavy-section and an upper portion 31 which is of reduced section and which extends between the top member 40 and the lower post portion 45. The upper post section 31 fits into the rabbet formed by the parts 24 and 30 of the pillar, and, like the pillar, is preferably formed of iron, brass or other metal of small section so as to offer the least obstruction to the vision of the driver of the automobile. As shown in Figs. 3 and 10 the door frame section 31 is of substantial width laterally and the rear side of this section is beveled or cut away at an angle to provide a rear face extending substantially to the outside door joint. The rearmost part of the door pillar thus lies inward and forward of a plane passing through the driver's position and through a point substantially coincident with the door joint at the outer side of the body. As the door frame pillar section is received in the rabbet provided in the outer rear portion of the pillar section 23 for substantially its full thickness and the total obstruction, as viewed from the driver's seat is less in width than the interpupilary distance between the eyes, the construction will provide a minimum obstruction to the vision of the driver.

The upper door section 31 consists of a plate portion 47 which is set in or secured to the lower door post section 45 and which forms therewith the edge of the door which abuts the plate portion 24 of the pillar. As shown in Fig. 4 a flange 48 extends rearwardly from the inner edge of the plate 47 and provides an abutment against which the lock board 44 may be secured. The lock board 44 is spaced sufficiently from the lower post section 45 and from the belt rail 43 to receive therebetween the window pane 52 which is carried by the door and which is adapted to be raised or lowered in the usual manner. The construction illustrated constitutes a simple and rugged construction for the lower portion of the door and serves to rigidly connect the upper door section with the lower door section.

The plate 47 of the upper door section is reduced in thickness and in width as indicated at 49 in Fig. 3, and as will be obvious from a comparison of Figs. 3 and 4 illustrating the comparative dimensions of the parts, these parts being shown to a scale substantially one half of their actual size. The upper post section 31 may be increased in thickness rearwardly from the plate 49 so as to provide a reinforcement, and also a shoulder or wall 50 which together with the plate 49 forms a rabbet adapted to receive the channel 51. This channel forms a guide for one edge of the window pane 52. Interposed between plate 49 and the bottom of the channel 51 is a sealing strip 53 which extends inwardly from the door and is adapted to engage the flange 30 of the pillar. A screw 54 traverses the plate 49, sealing strip 53 and the bottom wall of the channel 51 to secure these parts together, although it will be understood that any other suitable form of securing means may be employed.

The sealing strip 53 has a wiping contact upon the flange 30 of the pillar and seals the space between these parts effectively against the entrance of water. As in the case of the pillar, the hinges $35^a$ and $36^a$, which cooperate with the hinges 35 and 36 respectively, may be formed integral with the metallic upper door post 31.

As already stated the rabbet formed by the front face of the pillar receives therein the wind-shield frame 33. To seal the space between the wind-shield frame and the pillar against water or rain, the frame 33 is provided with a sealing strip 55 which may be secured in a rearwardly opening slot in the wind-shield frame. The wind-shield frame may be formed of frame members 56 and 57 having spaced apart marginal flange portions to provide a groove for the reception of the sealing strip 55. Bumpers 58 or buttons of shock absorbing material may be set into the pillar to abut the edge of the wind-shield frame in such a way as to offset any tendency of the same to rattle.

From the foregoing description it will be apparent that the present invention provides a pillar, door post, and wind-shield frame construction of greatly reduced section, and one which offers little obstruction to the vision of the driver. The pillar is of solid Z-shaped section, a construction which provides great strength for the available section. The front post of the door, which abuts the rear face of the pillar, is of light, yet substantial construction and is strengthened or reinforced by the rearwardly extending portion which forms the shoulder 50, but which does not reduce the vision of the driver. The wind-shield frame is set into a rabbet in the front door post in such a way as not to obstruct the vision of the driver.

An important feature of the present invention is the fact that the combined width of the pillar, and abutting door post and windshield frame in a direction transverse to direction of view of a person in the automobile is less than the normal distance between the eyes of such person, and as a consequence all objects beyond a given radius from the pillar may be fully visible to the person in the automobile. This feature of the invention is illustrated in Fig. 10, in which the point 60—61 designates the normal distance between the eyes of the driver or other person in the automobile. The combined width of the pillar, door post and wind-shield frame at right angles to the view of the driver is 62—57, and this width is less than 60—61. Lines of sight 60—62, and 61—57 which pass through points 60 and 61 and which are tangent to the pillar and associated parts, intersect at 63 thus forming triangle 60—63—61. It will be apparent that objects to the left of line 60—63 are visible to the left eye, that objects to the right of line 61—63 are visible to the right and that all objects at 63 or further removed are fully visible to both eyes. The distance of the point 63 from the pillar 32 depends upon the thickness of the pillar and associated parts and upon the position of the person in the automobile, but with the construction herein illustrated and the person sitting in the driver's seat the point 63 may be as close as fifteen feet from the pillar 32.

It is apparent that the present invention affords substantially full vision to the driver of an automobile since it is practically impossible for a person or an object such as another vehicle to approach the automobile without being visible to the driver.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An automobile comprising a body door having a window opening in the upper part thereof, comprising, top and bottom frame members, a door post connecting said top and bottom members, said door post having an upper post section including a metallic plate secured to said top frame member, a lower post section secured to said metallic plate to form therewith an edge of the door, a belt rail extending laterally from said door post, a flange extending from the rear face of the plate, a lock board secured to said flange, said lock board being spaced from said belt rail whereby to receive a window pane therebetween, a shoulder formed on said plate above the level of the belt rail to provide a rabbet at the inner edge of the plate to receive therein the edge of the window pane carried by the door.

2. An automobile comprising a body door having a window opening in the upper part thereof, comprising, top and bottom frame members, a door post connecting said top and bottom members, said door post having an upper post section including a metallic plate secured to said top frame member, a lower post section secured to said metallic plate to form therewith an edge of the door, a belt rail extending laterally from said door post, a flange extending from the rear face of the plate, a lock board secured to said flange, said lock board being spaced from said belt rail whereby to receive a window pane therebetween, a shoulder formed on said plate above the level of the belt rail to provide a rabbet at the inner edge of the plate, a channel seated in said rabbet and adapted to receive an edge of the window pane which is carried by the door, and means for rigidly securing said channel in said rabbet.

3. An automobile comprising a body door having a window opening in the upper part thereof, comprising, top and bottom frame members, a door post connecting said top and bottom members, said door post having an upper post section including a metallic plate secured to said top frame member, a lower post section secured to said metallic plate to form therewith an edge of the door, a belt rail extending laterally from said door post, a flange extending from the rear face of the plate, a lock board secured to said flange, said lock board being spaced from said belt rail whereby to receive a window pane therebetween, a shoulder formed on said plate above the level of the belt rail to provide a rabbet at the inner edge of the plate, a channel seated in said rabbet and adapted to receive an edge of the window pane which is carried by the door, a sealing strip between the bottom of the channel and said plate, and means for securing said channel and sealing strip in position.

4. In an automobile body of the closed car type, a pillar having a face adapted to abut the edge of a door, a flange extending from the inner edge of the pillar to form therewith a rabbet in which a door post is adapted to be received, a door post mounted to be swung into said rabbet, a channel having its bottom portion in engagement with the door post adjacent the inner edge thereof, a sealing strip interposed between the bottom of said channel and said door post and adapted to engage the flange on said pillar, and means for rigidly securing the channel and the sealing strip to said door post.

5. In an automobile body of the closed car type, a pillar having a face adapted to abut the edge of a door, a flange extending from the inner edge of the pillar to form therewith a rabbet in which a door post is adapted to be received, a door post mounted to be swung into said rabbet, the portion of the door post adjacent said flange being formed as a plate, a sealing strip overlying said plate and adapted to cooperate with said flange, a channel adapted to guide a window pane in the door, said channel overlying the sealing strip and having its bottom wall bearing thereagainst, and means traversing said flange, sealing strip and channel for rigidly securing the same together.

6. An automobile body of the closed type comprising metallic corner posts rising adjacent the cowl to support the roof, said posts having horizontally disposed flanges to underlie and support frame members of the roof and also upright flanges relatively angularly disposed and secured to and assisting in maintaining the relative position of the frame members.

In testimony whereof I hereto affix my signature.

ALEXANDER CARLSON.